United States Patent [19]

Hoegger

[11] 4,129,923

[45] Dec. 19, 1978

[54] CONTINUAL SAUSAGE STUFFING APPARATUS

[75] Inventor: Cornel Hoegger, Flawil, Switzerland

[73] Assignee: C. Hoegger & Cie. AG., Gossau, Switzerland

[21] Appl. No.: 854,083

[22] Filed: Nov. 23, 1977

[30] Foreign Application Priority Data

Nov. 29, 1976 [CH] Switzerland .................... 15008/76

[51] Int. Cl.² .................... A22C 11/02; A22C 11/10
[52] U.S. Cl. .................................... 17/33; 17/34
[58] Field of Search ............................ 17/33, 34

[56] References Cited

U.S. PATENT DOCUMENTS

| | | | |
|---|---|---|---|
| 3,191,222 | 6/1965 | Townsend | 17/33 |
| 3,971,101 | 7/1976 | Townsend et al. | 17/33 |

*Primary Examiner*—Willie G. Abercrombie
*Attorney, Agent, or Firm*—Scully, Scott, Murphy & Presser

[57] ABSTRACT

A sausage stuffing apparatus including a gripper apparatus for a sausage strand in which constricting forks are pivotable about their fastenings to movable chains. Provided on the gripper apparatus is at least one guide element for the pivotable guidance of the constricting forks, this guide element effecting the forks dividing the sausage strand into sausage lengths immediately after an end cone produces a constriction of the sausage strand, and successively again releasing the strand, and wherein the guide element is adjustably arranged in such a manner whereby the length of the engagement of the forks into the sausage strand is adjustable. At least one additional guide means is fixedly arranged on the gripper apparatus ahead of the constricting position.

10 Claims, 4 Drawing Figures

CONTINUAL SAUSAGE STUFFING APPARATUS

BACKGROUND OF THE INVENTION

1. Field of the Invention

The present invention relates to a continual sausage stuffing or filling apparatus, in which the sausage mixture is pushed into a sausage casing at a constant forward feed for the formation of a sausage strand, wherein the sausage stuffing apparatus incorporates a gripper apparatus with constricting forks which are fastened to rotating chains, and which intermittently engage into the sausage strand in order to divide the latter into regular portions.

2. Discussion of the Prior Art

Currently known sausage stuffing machines employed for the manufacture of portioned sausages are based primarily on the chamber principle. Hereby, for producing a volumetrically constant remaining portion volume, the sausage mixture is pressed into a chamber having an adjustable volume, thereafter pushed through a filling conduit into the sausage casing and then divided through twisting. This process is effected intermittently through interruption of the filling flow for the twisting or rotation, and the repeated filling and emptying of the apportioning chamber. The filling rhythm and, consequently, the output of these machines is restricted by the low load capacity of the sausage casings which are to be employed and through the dynamic conditions of the operating procedure.

In addition thereto, continuous sausage stuffing processes are known, wherein there are produced sausage portions from a sausage mixture strand which is pushed without interruption into a sausage casing and with continuously effected division. Such processes are described, for instance, in German Laid-open Pat. application No. 1,432,559 and German Pat. No. 1,051,672, as well as in U.S. Pat. Nos. 2,697,850; 2,776,449; 2,698,960; 2,698,691 and 1,245,652. In these processes the sausage mixture flow is produced through the intermediary of a continuously operating displacement pump. The division is regularly effected by means of an arrangement whose speed is correlated with the conveyed sausage mixture quantity. The division of the sausage strand may, for example, be accomplished by two interengaging chains with grippers, wherein the sausage strand and the sausage casing are held in constant rotation through the use of a turning spout and, in that manner there is produced the permanent division due to the twisting or rotation.

The drawback of these procedures consists of in that the portions must always be pushed at an approximately equal length in conformance with the distribution of the pickups on the gripper chain and, on the other hand, due to the high loads which are produced during the constriction of the filled sausage strand, there can be utilized only extremely tough and resistant sausage casings. Moreover, the heretofore realizable continual stuffing or filling machines were only applicable to relatively soft sausage mixtures which could be conveyed without problems in the mixture feed passageways formed with sharp edges and bends. The foregoing imparted a significant limitation to the range of application of known sausage stuffing machines.

SUMMARY OF THE INVENTION

Accordingly, it is an object of the present invention to provide a continual sausage stuffing apparatus which avoids the disadvantages encountered in presently known sausage stuffing apparatuses. The length of the sausages which are to be produced must be variable within predetermined bounds, and it should also be possible to process without problems low-resistant sausage casings, for example, natural guts or skins. The conveyance of the sausage mixture and the positioning of the operative components should be so arranged so as to also facilitate the employing of hard sausage quantities.

Inventively, the foregoing object is achieved in that the constricting forks are pivotable about their fastenings to the chain, that there is provided on the gripper apparatus at least one guide means for the pivotable guidance of the constricting forks, and that this guide means has the effect of the forks dividing the sausage strand immediately after an end cone or tapered sleeve producing the constriction of the sausage strand, and successively again releasing the strand, and wherein the guide means is adjustably arranged in such a manner whereby the extent of the engagement of the forks into the sausage strand is adjustable.

Advantageously, at least one additional guide means is fixedly arranged on the gripper apparatus ahead of the constricting position.

BRIEF DESCRIPTION OF THE DRAWINGS

Reference may now be had to a preferred embodiment of a sausage stuffing or filling apparatus according to the invention, taken in conjunction with the accompanying drawings; in which.

DETAILED DESCRIPTION

Figure 1:
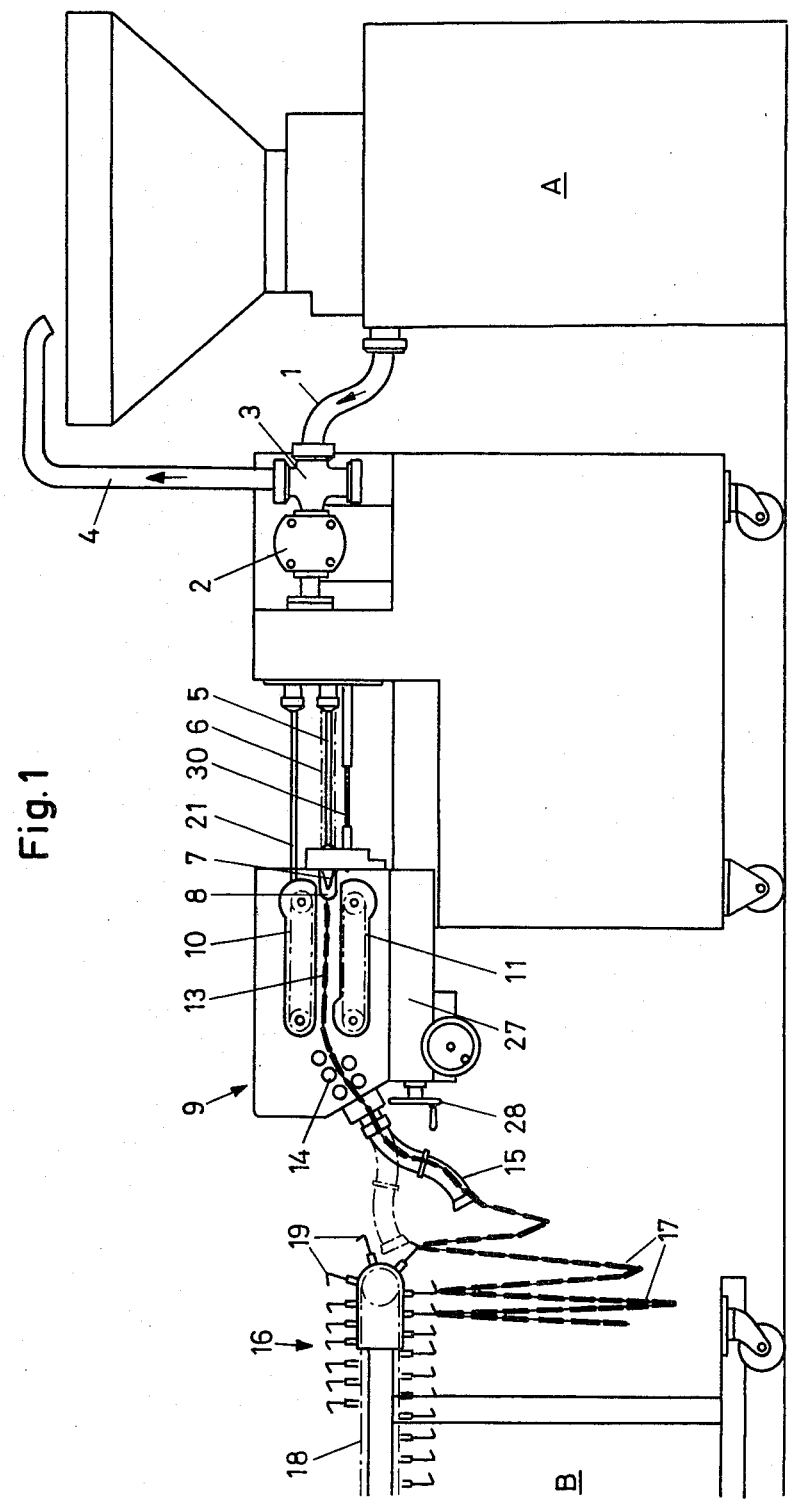
FIG. 1 is an elevational, partly diagrammatic, view of a continual sausage stuffing apparatus with a sausage mixture infeed installation located ahead thereof and sausage chain suspension apparatus arranged therebehind.
Figure 2:
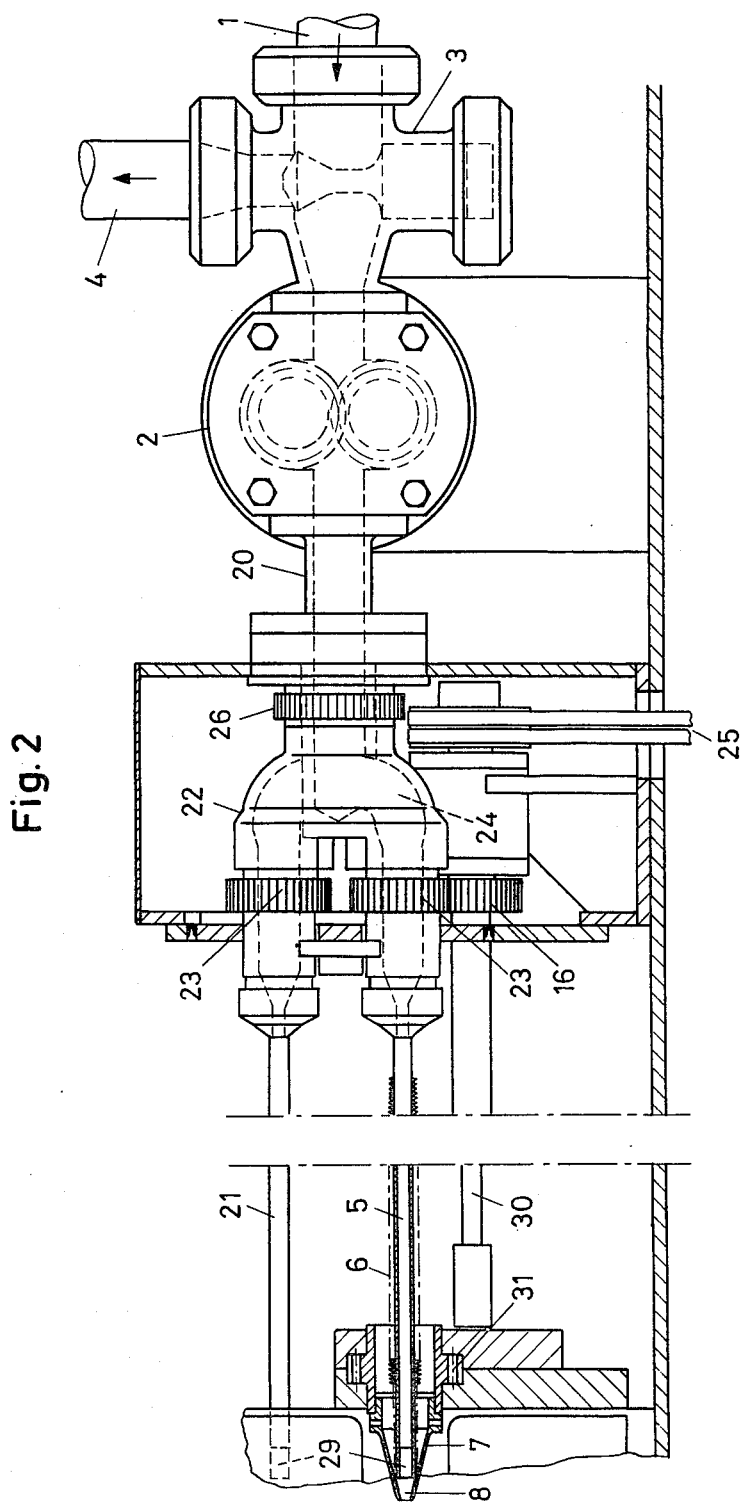
FIG. 2 is a longitudinal sectional view, on an enlarged scale, through the sausage mixture infeed components and the filler conduit of the sausage stuffing apparatus of FIG. 1.
Figure 3:
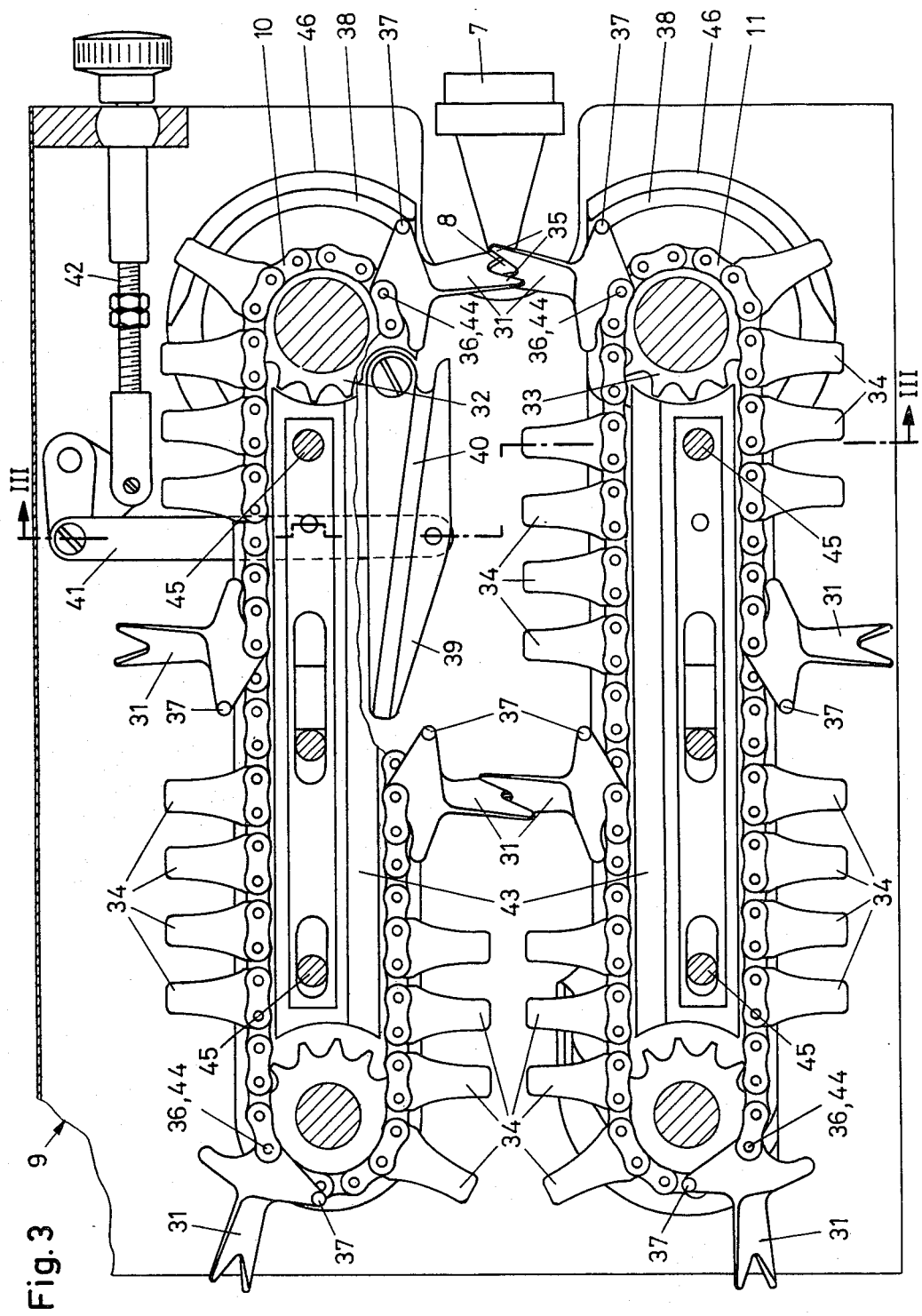
FIG. 3 is a longitudinal sectional view, on an enlarged scale, through the gripper apparatus of the machine of FIG. 1.
Figure 4:
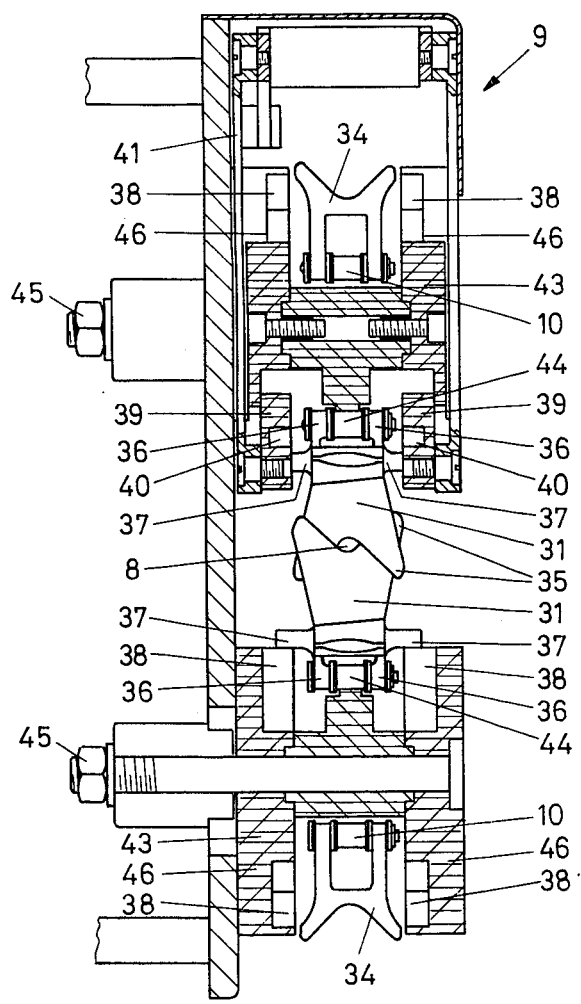
FIG. 4 is a sectional view through the gripper apparatus taken along line III—III in FIG. 3.

The function of the sausage stuffing or filling apparatus is now, initially, generally elucidated in connection with the overall view of FIG. 1 of the drawings.

The filling mixture material is conducted from a known per se sausage stuffing infeed installation A, for example, a normal continuously-operating vacuum filling machine, through the inlet conduit 1 into the volumetrically operating sausage mixture feed pump 2 at a predetermined pressure. Any possible mixture excess is reconveyed into the hopper of the sausage mixture infeed installation A through the bypass valve 3 and the return conduit 4. From the pump 2, the sausage mixture is conveyed into the rotating filler conduit 5 on which there is slid or mounted the sausage casing 6.

Within the filler conduit 5 the mixture is formed into a continuous sausage mixture strand which, at the end of the filler conduit 5 is constricted in its cross section by means of an end cone or tapered sleeve 7 provided at this location and rotating at the same rotational speed, and is encompassed by the sausage casing.

Immediately at the constricting location 8, the sausage strand is engaged by the gripper apparatus 9, the latter of which encompasses two oppositely directed gripper chains 10, 11.

In the gripper apparatus 9, the individual sausages 13 are continuously formed, in a manner to be described in greater detail hereinbelow, and then further conveyed between the gripper chains 10, 11 towards the guide rollers 14. The guide rollers are motor-driven and exert a clamping and forwardly pulling force on the sausage strand.

From there the sausages 13, which are formed in series-connection in the strand, are conveyed into the rotating discharge tube 15 and, subsequently, to the suspending installation 16 of the sausage-chain suspension apparatus B. Through the rotation of the discharge or outlet conduit 15 there is attained that the sausages 13 are suspended in loops 17 on the hook chain 18 with hooks 19, which is conveyed forward intermittently through, for instance, a pawl and ratchet device.

In order to achieve a uniform degree of filling of the volumetric sausage mixture pump 2, constructed as a gear pump, the filling material is introduced under a predetermined pressure, so that excess material is reconveyed through the bypass valve 3 into the feed hopper of the connected-ahead sausage preparing installation A. Advantageously, the bypass valve 3 serves for pressure regulation whereby its valve piston can be pneumatically adjusted for this purpose.

In the illustrated embodiment, the feed pump is driven by means of a direct current motor (not shown in detail) which is coupled in a suitable manner through a precision operating electronic control installation with subsequent, analog and separate drives for the rotation of the filler conduit 5 and the drive for the gripper chains 10, 11. The speed of each of the subsequent aggregates is adjustable with respect to that of the feed pump in a proportional and load-independent controlled relationship. Through the stepless capability of adjusting the feed pump drive, there can be adjusted the speed of the entire operating process, in that the two subsequent drives are automatically regulated thereafter in a proportional relationship.

The adjustment of the filling weight of the sausage is undertaken on the basis of the proportional adjustment of the speed of the gripper chains in relation to the feeding speed of the pump.

The sausage mixture conveyances through the bypass valve 3 and through the sausage pump 2 are advantageously so designed that a sparing sausage flow is produced with constant, relatively richly measured cross-sections, and that it is even possible to provide for the through-passage of a relatively solid sausage mixture, and which is suitable for "spreading".

From the feed pump 2, the sausage mixture is conducted through a central inlet conduit 20 to the filler tube or conduit 5 which, together with a second, upper filler conduit 21, is located in a tandem arrangement on a rotatable revolving turret 22. The arrangement serves the purpose that a new casing or gut can be mounted or pulled onto the filler conduit 21 while the sausage stuffing apparatus is in operation. Consequently, only the lower filler tube 5 is driven by the pinion 23, whereas the upper filler tube 21 remains stationary and the sausage mixture stream flows through the aperture 24 only towards the lower filler tube 5. The rotational drive of the filler tube 5 is also carried out, as mentioned hereinabove, through the direct current motor which is controlled by the electronic control arrangement, by means of a V-belt drive 25.

The revolving turret 22 which carries the two filler tubes or conduits 5 and 21, is actuated by means of a gear ring 26 so that, selectively, one or the other filler tube is in an operative position. The gear ring 26, for example, can be brought onto its two end positions by means of a pneumatic cylinder.

The positioning of the sausage casing 6 on the filler tube 21 is manually effected in the exemplary embodiment. However, it can also be carried out through a suitable automatically operating mounting installation, for instance, such as are known from the previously mentioned publications.

When the sausage casing has been completely slid onto the filler tube 5, the end cone 7, together with the gripper apparatus 9, are displaced as an entity in an axial direction. For this purpose the gripper apparatus 9 is mounted on a carriage 27 (FIG. 1) which, for example, is displaceable through the action of a compressed-air cylinder. Thusly, the second filler tube 21 which, in the interim has been supplied with a new sausage casing, is brought into its operative position, which can be effected in an automatic controlled sequence.

The filler conduits or tubes 5, 21 each includes a resilient hose member 29 at its end which presses the sausage casing 6 against the inner wall of the end cone 7 so as to prevent a return flow of the filling material The end cone 7 is driven at the same rotational speed as the filler tube 5 through a drive shaft 30 and the gear pinion 31.

The two gripper chains 10, 11 are oriented to face each other and are driven through the intermediary of the opposedly rotating gears, 32, 33. Arranged on each chain 10, 11 is, respectively, the same number of constricting forks 31 and, intermediate these, a same number of guide elements 34. The guide elements serve for the guidance of the sausage strand within the gripper apparatus. They center the sausage strand, however, without clamping the latter in either an axial or in a sidewise or lateral direction.

The constricting forks 31 engage the sausage strand precisely at the constricting location 8 which is effected through the end cone or tapered sleeve 7, so that the constriction takes place between the bifurcated ends or tines 35 of the interengaging forks 31. This will result in the extent of constriction to be further reduced to a minimum cross-section so that, due to the rotating filler tube and the cone, there is immediately produced a twisting of the constricted sausage casing.

The constricting forks are arranged so as to be pivotable about their fastenings 36 on chains 10, 11. Furthermore, they are provided with sideways-extending guide projections 37 which, on both sides of the chains 10, 11, are adapted to engage in suitable guide grooves 38 arranged in the path of movement ahead of the constricting location. The guide grooves 38 are provided on guide elements 46 of the gripper apparatus.

The foregoing will achieve that each of the constricting forks 31 will exert an additional pivotal movement about the axis 44 of its fastening 36 during the constricting procedure, through which there is afforded the precise engagement of the tines of the forks 35 directly at the outlet or orifice of the end cone 7.

In this instance, the end cone 7 is so constructed that, at its outlet, there is attained an extensive constriction of the sausage mixture-filled sausage casing 6, so that the constricting forks 31 are enabled to directly engage into the sausage strand at this constricting location 8.

Thusly, the forks 31 which move in conjunction with the sausage strand are conveyed into the area of an upper guide rail 39, whose guide grooves 40 arranged on both sides of the upper chain 10 assume the control over the upper forks 31. The projections 37 on these forks are then so conducted through the inclined positioned guide rails 39, so that the interengaging constricting forks will successively release the constricting location.

Through this forced control of the forks immediately after the effectuated constriction, there can be influenced the length of the sausage. The position of the guide rail 39 can be correlated with the desired sausage length by means of the lever mechanism 41 and the adjusting screw spindle 42. By means of the adjusting elements 41, 42 there can be changed the inclination and the spacing of the guide rail 39 from the axis of the sausage strand. Due to the inclination or slope of the guide rail 39, there is effected a rearwardly pivoting of the forks 31, so that these can operate with the successive release of the constricting location 8 of the sausage.

As soon as the constricting forks have reached the end of the guide rail, the projections 37 are released by the guide groove 40. In the interim, subsequent forks have formed a new constriction at the end cone, and the previously described process is now repeated.

The chains 10, 11 are assembled with a determinate number of constricting forks 31 and guide elements 34 on a support frame 43. For a given chain combination, the sausage length can be varied within a relationship of about 1:2 by means of the adjustable guide rail 39. Above all, a prerequisite to the foregoing is that there is effected a corresponding correlation of the infeed volume of the sausage mixture feed pump, with reference to the chain speed. For sausage dimensions which do not lie within this adjusting range, quite simply another chain combination is selected and the support frame 43 is exchanged.

Thus, in the present inventive sausage stuffing apparatus there can be completely assembled chains with, respectively three, four, six or twelve forks, and mounted on its own support frame. The exchange can be rapidly and precisely effected by means of two screws 45.

What is claimed is:

1. In a sausage stuffing apparatus including means for pushing a sausage mixture at a steady and constant forward motion into a sausage casing for forming a sausage strand; and said apparatus including a gripper apparatus having rotating chains, and contricting forks fastened to said chains adapted to intermittently engage into said sausage strand to divide the latter into regular portions, the improvement comprising: said constricting forks being pivotably fastened to said chains; at least one guide means on said gripper apparatus for the displaceable guidance of said constricting forks; and end core forming a constriction in said sausage strand, said guide means causing said forks to divide and successively release said sausage strand immediately at said constriction formed by said end cone; and means for adjustably positioning said guide means so as to vary the extent of engagement of said forks into said sausage strand.

2. An apparatus as claimed in claim 1, comprising at least one additional guide means being fixedly mounted on said gripper apparatus ahead of said end cone.

3. An apparatus as claimed in claim 2, comprising sideways extending projections being provided on said constricting forks; and guide grooves being formed in said adjustable and additional guide means, said projections being engageable in said guide grooves.

4. An apparatus as claimed in claim 2, said additional guide means comprising two guide curves for displacing said constricting forks relative to the direction of movement of said chains, so as to engage into said sausage strand directly at the outlet of said end cone and to effect a minimum constriction.

5. An apparatus as claimed in claim 2, said adjustable guide means comprising guide rails with guide grooves; and adjusting means being connected to said guide rail for varying the inclined position and spacing from the axis of the sausage strand of said guide rail.

6. An apparatus as claimed in claim 1, comprising guide elements being mounted on said chains for centering the sausage strand on said chains.

7. An apparatus as claimed in claim 1, said gripper apparatus comprising an exchangeable frame, said chains being mounted on said frame.

8. An apparatus as claimed in claim 1, comprising a rotatable filler tube being arranged immediately ahead of said constricting location, said end cone being mounted on the end of said tube proximate said location and being rotatable with said tube.

9. An apparatus as claimed in claim 1, said constricting fork being pivotable in the plane of said chains.

10. An apparatus as claimed in claim 8, said end cone having a conical bore and a conical outer configuration so as to facilitate constriction in the crosssection of said sausage strand upon exiting from said filler tube, and to attain the engagement of said constricting forms immediately at the outlet of said end cone.

* * * * *